(12) United States Patent
Martini et al.

(10) Patent No.: US 8,838,829 B2
(45) Date of Patent: Sep. 16, 2014

(54) PSEUDOWIRE (PW) SWITCHING TYPE-LENGTH-VALUE (TLV)

(75) Inventors: Luca Martini, Denver, CO (US); W. Mark Townsley, Nashville, TN (US); Earl Hardin Booth, III, Raleigh, NC (US); Christopher Metz, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1714 days.

(21) Appl. No.: 11/178,647

(22) Filed: Jul. 11, 2005

(65) Prior Publication Data

US 2007/0011352 A1    Jan. 11, 2007

(51) Int. Cl.
  *G06F 15/16* (2006.01)
  *G06F 15/173* (2006.01)
  *H04L 12/751* (2013.01)
  *H04L 12/721* (2013.01)

(52) U.S. Cl.
  CPC .............. *H04L 45/26* (2013.01); *H04L 45/02* (2013.01)
  USPC ........... 709/238; 709/227; 709/228; 709/229; 709/242

(58) Field of Classification Search
  USPC ................. 709/238, 239, 242, 227, 228, 229; 370/393
  See application file for complete search history.

(56) References Cited

U.S. PATENT DOCUMENTS

| | | | |
|---|---|---|---|
| 6,678,264 B1 * | 1/2004 | Gibson | 370/352 |
| 6,680,943 B1 * | 1/2004 | Gibson et al. | 370/392 |
| 7,110,363 B1 * | 9/2006 | Lawrence et al. | 370/236.1 |
| 7,127,180 B1 * | 10/2006 | Khera et al. | 398/156 |
| 7,155,518 B2 * | 12/2006 | Forslow | 709/227 |
| 2003/0128717 A1 * | 7/2003 | Johnson et al. | 370/458 |
| 2003/0145105 A1 * | 7/2003 | Desineni et al. | 709/238 |
| 2004/0233891 A1 * | 11/2004 | Regan et al. | 370/351 |
| 2005/0044262 A1 * | 2/2005 | Luo | 709/238 |
| 2005/0089047 A1 * | 4/2005 | Ould-Brahim et al. | 370/395.53 |
| 2005/0094630 A1 * | 5/2005 | Valdevit | 370/360 |
| 2005/0147104 A1 * | 7/2005 | Ould-Brahim | 370/395.5 |
| 2005/0169266 A1 * | 8/2005 | Aggarwal et al. | 370/389 |

(Continued)

OTHER PUBLICATIONS

Martini, et al., "Pseudowire Setup and Maintenance using LDP", available on Jun. 5, 2009, at http://tools.ietf.org/html/draft-ietf-pwe3-control-protocol-15.txt, 34 pgs.

(Continued)

*Primary Examiner* — Rupal Dharia
*Assistant Examiner* — Mohammed Ahmed
(74) *Attorney, Agent, or Firm* — Brinks Gilson & Lione

(57) ABSTRACT

A method and apparatus for providing information in a network by way of a Pseudowire switching TLV is presented. A second device in the network receives a first message having information relating to a first device in the network. The second device appends information relating to the second device (by way of a Pseudowire switching TLV) to the first message, resulting in a second message. The second message is then forwarded to a third device in the network.

22 Claims, 4 Drawing Sheets

(56) References Cited

U.S. PATENT DOCUMENTS

| | | | |
|---|---|---|---|
| 2005/0195835 A1* | 9/2005 | Savage et al. | 370/401 |
| 2005/0286558 A1* | 12/2005 | Ould-Brahim et al. | 370/467 |
| 2006/0013142 A1* | 1/2006 | Hongal et al. | 370/248 |
| 2006/0080421 A1* | 4/2006 | Hu | 709/223 |
| 2006/0291445 A1* | 12/2006 | Martini et al. | 370/351 |
| 2008/0084891 A1* | 4/2008 | Balus et al. | 370/409 |
| 2008/0095061 A1* | 4/2008 | Hua et al. | 370/248 |
| 2008/0253367 A1* | 10/2008 | Ould-Brahim | 370/389 |
| 2008/0270580 A1* | 10/2008 | Lange et al. | 709/220 |
| 2008/0279198 A1* | 11/2008 | Gruber et al. | 370/400 |
| 2009/0161675 A1* | 6/2009 | Aggarwal et al. | 370/390 |

OTHER PUBLICATIONS

Martini et al., "Transport of Layer 2 Frames Over MPLS", available on Jun. 5, 2009, at http://tools.ietf.org/html/draft-martini-12circuit-trans-mpls-16.txt, 23 pgs.

"Area and Working Group Report—Internet Area", Proceedings of the Fifty-Ninth Internet Engineering Task Force, Feb. 29-Mar. 4, 2004, available on Jun. 5, 2009, at http://www.ietf.org/proceedings/04mar/023.htm, 119 pgs.

D. Awduche et al., "RSVP-TE: Extensions to RSVP for LSP Tunnels", available on Jun. 5, 2009, at http://www.ietf.org/rfc/rfc3209.txt, 57 pgs.

* cited by examiner

PSEUDOWIRE (PW) SWITCHING TYPE-LENGTH-VALUE (TLV)

BACKGROUND

Computer networks have become ubiquitous. Computer networks include the Internet, Service Provider (SP) networks, private networks, and Local Area Networks (LANs). A network such as an SP network may include peripherally located Provider Edge (PE) routers, each of which couples to one or multiple Customer Edge (CE) routers. For the core network, an ingress PE uses BGP functions to determine the egress PE.

Virtual Private Networks (VPNs) provide a secured means for transmitting and receiving data between network nodes even though a corresponding physical network supporting propagation of the data is shared by many users (and VPNs). In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router. A Pseudowire (PW) may be utilized to transfer data across the PSN. A Pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

The signaling and encapsulation techniques for establishing Single Segment Pseudowires (SS-PWs) between a pair of Ultimate PEs (U-PEs) is well known. In some cases an SS-PW is insufficient. In such a case, a Multi-Segment Pseudowire (MS-PW) composed of more than one SS-PW, traversing one or more Switching Point PEs (SP-PEs) may be used.

SUMMARY

Conventional mechanisms such as those explained above suffer from a variety of deficiencies. One such deficiency is that in conventional network systems using MS-PWs, an MS-PW may traverse several switching points, involving multiple routers in separate administrative domains. The PWs may eventually lose context of where the MS-PW originated, how many hops it has traversed, etc. This makes troubleshooting and management difficult, particularly across administrative domains where access to all equipment participating in the MS-PW's establishment may be limited.

In some environments it may not be possible, desirable or feasible to establish a PW control channel between the ultimate source and destination PEs. At a minimum PW control channel establishment requires knowledge of and reachability to the remote (ultimate) PE IP address. The local (ultimate) PE may not have access to this information related to topology, operational or security constraints.

Another deficiency involves a single Autonomous system (AS) where the PW setup path between the ultimate PEs is computed by an external entity (i.e., a client-layer routing protocol). For example, given a full mesh of PWE3 control channels established between PE-A, PE-B and PE-C. A client-layer L2 connection tunneled through a PW is required between ultimate PE-A and PE-C. The external entity computes a PW setup path that passes through PE-B. This results in two discrete PW segments being built: one between PE-A and PE-B and one between PE-B and PE-C. The successful client-layer L2 connection between ultimate PE-A and ultimate PE-C requires that PE-B performs the PWE3 switching process.

Embodiments of the invention significantly overcome such deficiencies and provide mechanisms and techniques that provide a Pseudowire (PW) switching Type-Length-Value (TLV) which is used to provide information across a network which includes information regarding the different routers in the path that make up a MS-PW. The PW switching TLV can be used to facilitate troubleshooting, operation and management of MS-PWs by providing information at each PE about the originating and switching point PEs along an MS-PW path. The PW switching TLV can further be used for passing PW status messages pertaining to a specific U-PE or SP-PE along an MS-PW. The ability to document the actual path that a PW setup message utilizes is very important for managing a complex network of PWs, particularly when spanning different providers. By way of the present invention, a PE can receive specific status messages from an intermediate S-PE or U-PE nodes, and take appropriate action. The PW switching TLV transmits more then just a route as the description, the PW ID of the SS-PW traversed, as well as identification information for each SP-PE are also transmitted. The PW switching TLV can be used in conjunction with PW status messages to indicate which specific node along the path has sent the PW status message.

As described above, a MS-PW is composed of more than one SS-PW, traversing one or more Switching Point PEs (SP-PEs). When traversing each SP-PEs, information from the U-PEs and SP-PEs may be gathered and passed along to the next PE. This information aids greatly in troubleshooting and provisioning of MS-PWs.

The edge-to-edge PW might traverse several switching points, in separate administrative domains. For management and troubleshooting reasons it is useful to record all the switching points that the PW traverses. This is accomplished by using a PW switching point TLV.

In a particular embodiment of a method of providing information in a network, the method includes receiving, at a second device in the network, a first message having information relating to a first device in the network. The method includes appending, by the second device, information relating to the second device to the first message, resulting in a second message. The method further includes forwarding the second message to a third device in the network.

Other embodiments include a method of determining a path between network devices. This method includes receiving, at an intermediate network device located between a source network device and a destination network device, a first message including upstream path information between the intermediate device and the source device. The method further includes receiving at the intermediate network device a second message including downstream path information between the intermediate device and the destination device. The method additionally includes combining, at the intermediate network device, the upstream path information and the downstream path information to determine a complete path from the source network device to the destination network device which includes the intermediate device.

Still other embodiments include a computerized device or system, configured to process all the method operations disclosed herein as embodiments of the invention. In such embodiments, the computerized device or system includes a memory system, a processor, communications interface in an interconnection mechanism connecting these components. The memory system is encoded with a process that provides and utilizes a PW switching TLV as explained herein that when performed (e.g. when executing) on the processor, operates as explained herein within the computerized device to perform all of the method embodiments and operations explained herein as embodiments of the invention. Thus any computerized device or system that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a Pseudowire switching TLV as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
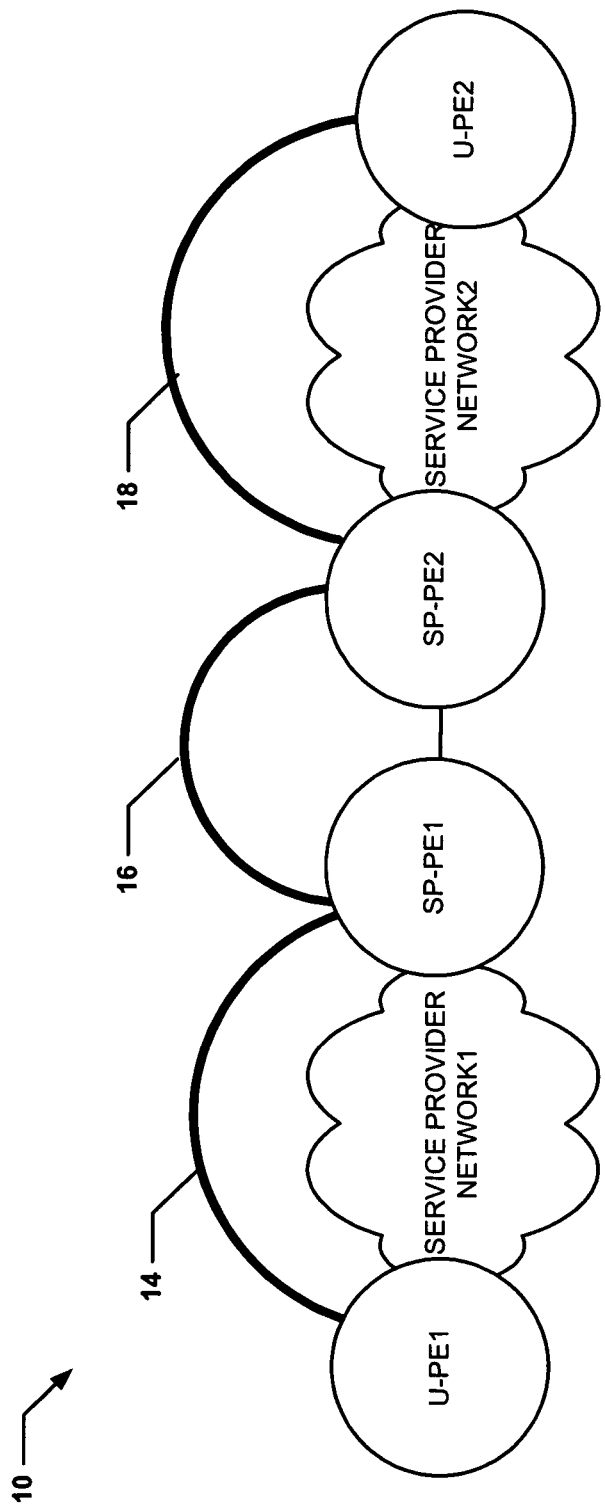
FIG. 1 illustrates an example network topology showing a network having a multi-segment Pseudowire extending from a first ultimate PE device to another ultimate PE device in accordance with embodiments of the present invention.

In order to utilize a Pseudowire (PW), the PW must first be established. In order to establish a PW, a Virtual Private Wire Service (VPWS) PE is configured with the Target Attachment identifier of the remote PE and the IP address of the remote PE. The PE then performs a lookup in the local Multi Packet Label Switching Label Forwarding Information Base (MPLS LFIB) for a Next Hop Label Forwarding Entry (NHLFE) that contains a Label Switching Path (LSP) to reach the destination PE. If an LSP is found, the PW is set up.

A "PW switching point" is a mechanism (in the form of a TLV) which carries information about each PE over the MS-PW signaling infrastructure. During a Multi-Segment Pseudowire (MS-PW) establishment, information about the originating ultimate PE (U-PE) and each switching point provider edge router (SP-PE) is gathered into a TLV, appended and passed to the next PE. Each PE then copies information from the previous PE, appending its own information for the next PE and so on. The destination U-PE then has a full record of the various SP-PEs that the PW has traversed, as well as the originating U-PE.

The SP-TLV is not only used during PW establishment, but can also be used for identifying the origin of a status notification message as well. Status notification messages are used to indicate state changes to an interface or PW without actually tearing down the PW (for example, signaling that an interface is temporarily disabled, an alarm, etc.). This same SP-TLV is included with the Status Message to indicate the origin of the message. This allows any PE (whether a U-PE or an SP-PE) to send a status message, and for the destination PE to know where the message originated. SP-TLVs may be appended at each PE as during setup, or simply passed without appending new TLVs at each point (in the latter case, that this information has not changed since PW setup and should be cached at the U-PE).

The actual format of the SP-TLV could take on many forms, and the following is one example, provided for purposes of explanation.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|   PW sw TLV (0x096B)       |       PW sw TLV  Length      |
+-+-+-+-+-+-+-+-+-+-+-+-+-+-+-+-+-+-+-+-+-+-+-+-+-+-+-+-+-+-+-+-+
|    Type       |     Length     |     Variable Length Value    |
+-+-+-+-+-+-+-+-+-+-+-+-+-+-+-+-+-+-+-+-+-+-+-+-+-+-+-+-+-+-+-+-+
|                      Variable Length Value                    |
|                                "                              |
+-+-+-+-+-+-+-+-+-+-+-+-+-+-+-+-+-+-+-+-+-+-+-+-+-+-+-+-+-+-+-+-+
```

The PW switching point TLV is appended to the PW FEC at each switching point.

The PW sw TLV Length field specifies the total length of all the following PW switching point TLV fields in octets. The Type field encodes how the Value field is to be interpreted. The Length field specifies the length of the Value field in octets.

At the PW switching point there is no attachment circuit, but instead two PWs connected together. Similarly, the status of the PWs is forwarded unchanged from one PW to the other by the control plane switching function. However, it may sometimes be necessary to communicate the status of one of the locally attached Single Hop Pseudowire (SH-PW) at a PW switching point.

The Type Values are assigned as follows:

| Type | Length | Description |
| --- | --- | --- |
| 0x00 | 0 | Reserved |
| 0x01 | 4 | PW ID of last PW traversed |
| 0x02 | variable | PW Switching Point description string |
| 0x03 | 4 | IP address of PW Switching Point (Optional) |

For LDP this can be accomplished by sending an LDP status notification message containing the PW status TLV, as well as a PW switching point TLV, an example of which is shown as follows.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|   Notification (0x0001)     |         Message Length         |
+-+-+-+-+-+-+-+-+-+-+-+-+-+-+-+-+-+-+-+-+-+-+-+-+-+-+-+-+-+-+-+-+
|                            Message ID                          |
+-+-+-+-+-+-+-+-+-+-+-+-+-+-+-+-+-+-+-+-+-+-+-+-+-+-+-+-+-+-+-+-+
|0|1|   Status (0x0300)         |           Length               |
+-+-+-+-+-+-+-+-+-+-+-+-+-+-+-+-+-+-+-+-+-+-+-+-+-+-+-+-+-+-+-+-+
|0|1|              Status Code=0x00000028                        |
+-+-+-+-+-+-+-+-+-+-+-+-+-+-+-+-+-+-+-+-+-+-+-+-+-+-+-+-+-+-+-+-+
|                         Message ID=0                           |
+-+-+-+-+-+-+-+-+-+-+-+-+-+-+-+-+-+-+-+-+-+-+-+-+-+-+-+-+-+-+-+-+
|       Message Type=0         |         PW Status TLV           |
+-+-+-+-+-+-+-+-+-+-+-+-+-+-+-+-+-+-+-+-+-+-+-+-+-+-+-+-+-+-+-+-+
|                           PW Status TLV                        |
+-+-+-+-+-+-+-+-+-+-+-+-+-+-+-+-+-+-+-+-+-+-+-+-+-+-+-+-+-+-+-+-+
|       PW Status TLV          |           PWId FEC              |
+-+-+-+-+-+-+-+-+-+-+-+-+-+-+-+-+-+-+-+-+-+-+-+-+-+-+-+-+-+-+-+-+
|                                                                |
|                  PWId FEC or Generalized ID FEC                |
|                                                                |
+-+-+-+-+-+-+-+-+-+-+-+-+-+-+-+-+-+-+-+-+-+-+-+-+-+-+-+-+-+-+-+-+
|1|0|    PW sw TLV (0x096B)    |        PW sw TLV Length         |
+-+-+-+-+-+-+-+-+-+-+-+-+-+-+-+-+-+-+-+-+-+-+-+-+-+-+-+-+-+-+-+-+
|     Type     |    Length     |     Variable Length Value       |
+-+-+-+-+-+-+-+-+-+-+-+-+-+-+-+-+-+-+-+-+-+-+-+-+-+-+-+-+-+-+-+-+
```

It should be noted that the SP-TLV is appended to the end of the status message, as shown above.

Referring now to FIG. 1, a network 10 implementing a particular embodiment of the present method for using Pseudowire switching TLVs in a MS-PW is shown. In this network 10, a first Ultimate provider edge router (U-PE1), also referred to as an originating U-PE, is shown in communication with a first service provider network (service provider network1). Also in communication with U-PE1 is SP-PE1 which communicates with U-PE1 by way of service provider network1. SP-PE1 is also in communication with SP-PE2, which is part of a second service provider network (service provider network 2). SP-PE2 is further in communication with U-PE2, also referred to as a destination U-PE, via service provider network2. It should be appreciated that while only a three segment MS-PW (comprised of segments 14, 16, and 18) is shown and described, the present invention should not be limited to a three segment MS-PW and the description of the present invention applies to an MS-PW have any number of segments and any number of SP-PEs.

In operation, a MS-PW is set up including multiple segments 14, 16 and 18. Part of the messaging used to setup the MS-PW involves a setup message. The message is originated at U-PE1 and includes a first TLV which includes information regarding U-PE1. This information may include a PW ID for identifying the particular MS-PW as well as other related information. This first TLV is received by the next hop, in this instance SP-PE1. SP-PE1 appends a second TLV to the first TLV to provide a new message. The second TLV contains information relating to SP-PE1. The information relating to SP-PE1 may include routing information, a description of the route and identification information of the PE.

This new message is then forwarded to the next hop. The next hop in this example is SP-PE2, which takes the message having the first TLV and the second TLV and appends a third TLV to it to provide a new message. The third TLV contains information relating to SP-PE2. The information relating to SP-PE2 may include routing information, a description of the route and identification information of the PE.

This new message is then forwarded to the next hop. The next hop in this instance is U-PE2. U-PE2 now has information relating to the origination of the MS-PW and all the hops between the originating U-PE and the destination U-PE. While the path beginning at U-PE1 and ending at U-PE2 has been described, the present invention is bi-directional and also works when a message is initiated at U-PE2 and traverses the MS-PW to U-PE1.

A similar procedure takes place when status messages are transmitted across the MS-PW. A status message can be originated by any PE of the path, and is used to indicate to other PEs the occurrence of a link or next hop failure. For a status message, an SP-PE may append its TLV to an originator's TLV or may pass the originators TLV directly through without appending its TLV thereto (for example, if the information has not changed since the MS-PW was setup and the information is therefore cached at the U-PE).

Referring again to FIG. 1, if SP-PE1 where to originate a status message, SP-PE1 would send the status message downstream to SP-PE2. SP-PE2 could either append its TLV to the message and send the message including the appended TLV to U-PE2 or could determine not to append its TLV to the status message and pass the message straight thru to U-PE2.

Since the chain of paths is bi-directional between the U-PEs, the information relating to the total path from end to end is available at each node of the path. For example, SP-PE2, since it has received messages forwarded downstream for the MS-PW and has also received messages upstream for the MS-PW, may take the downstream chain of nodes and combine it with the upstream chain of nodes (e.g. by using the PWID) and produce a chain of nodes which described the MS-PW from end to end.

Figure 2:
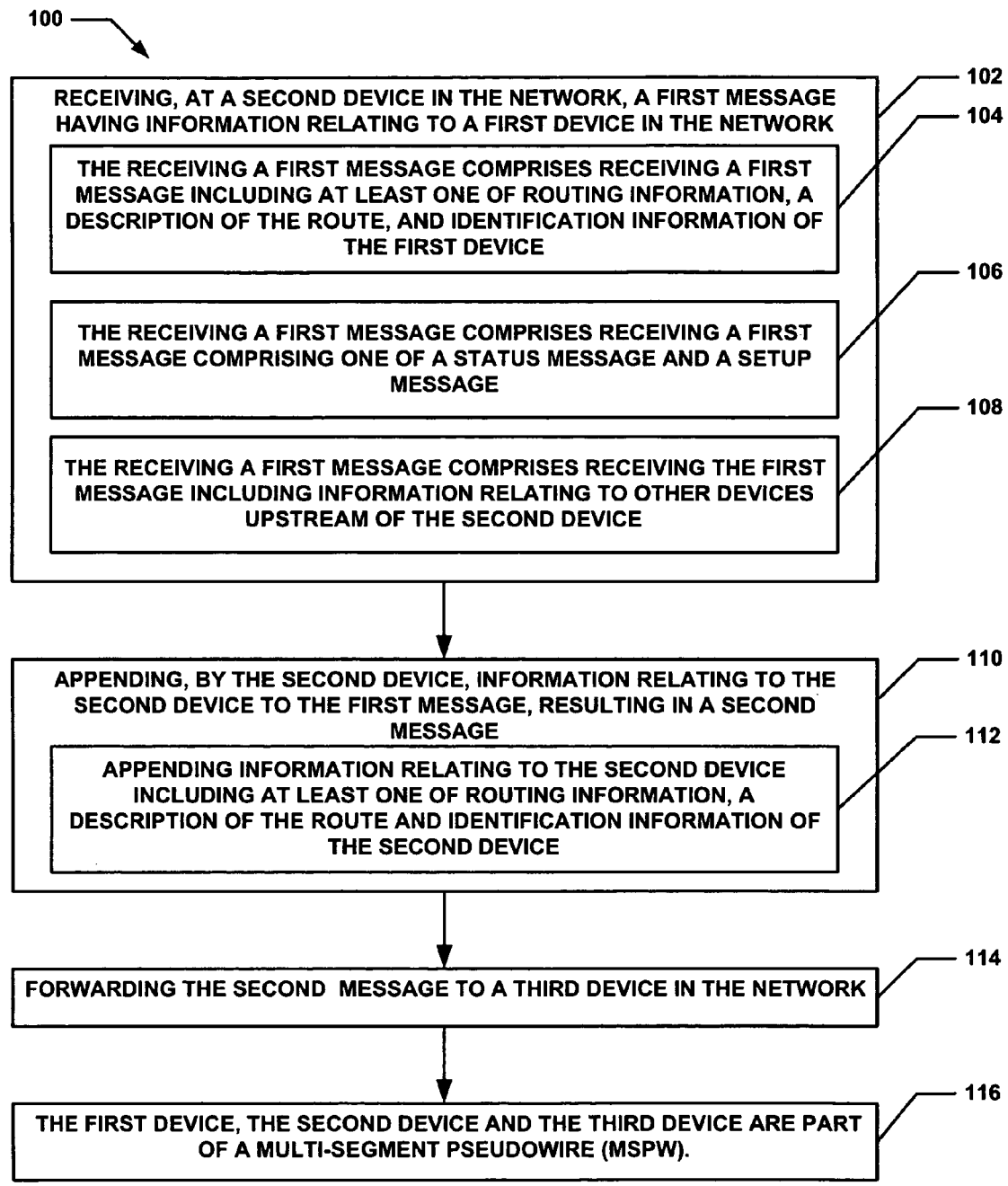
FIG. 2 illustrates a flowchart for a particular embodiment of a method of providing and utilizing a Pseudowire switching TLV.
Figure 3:
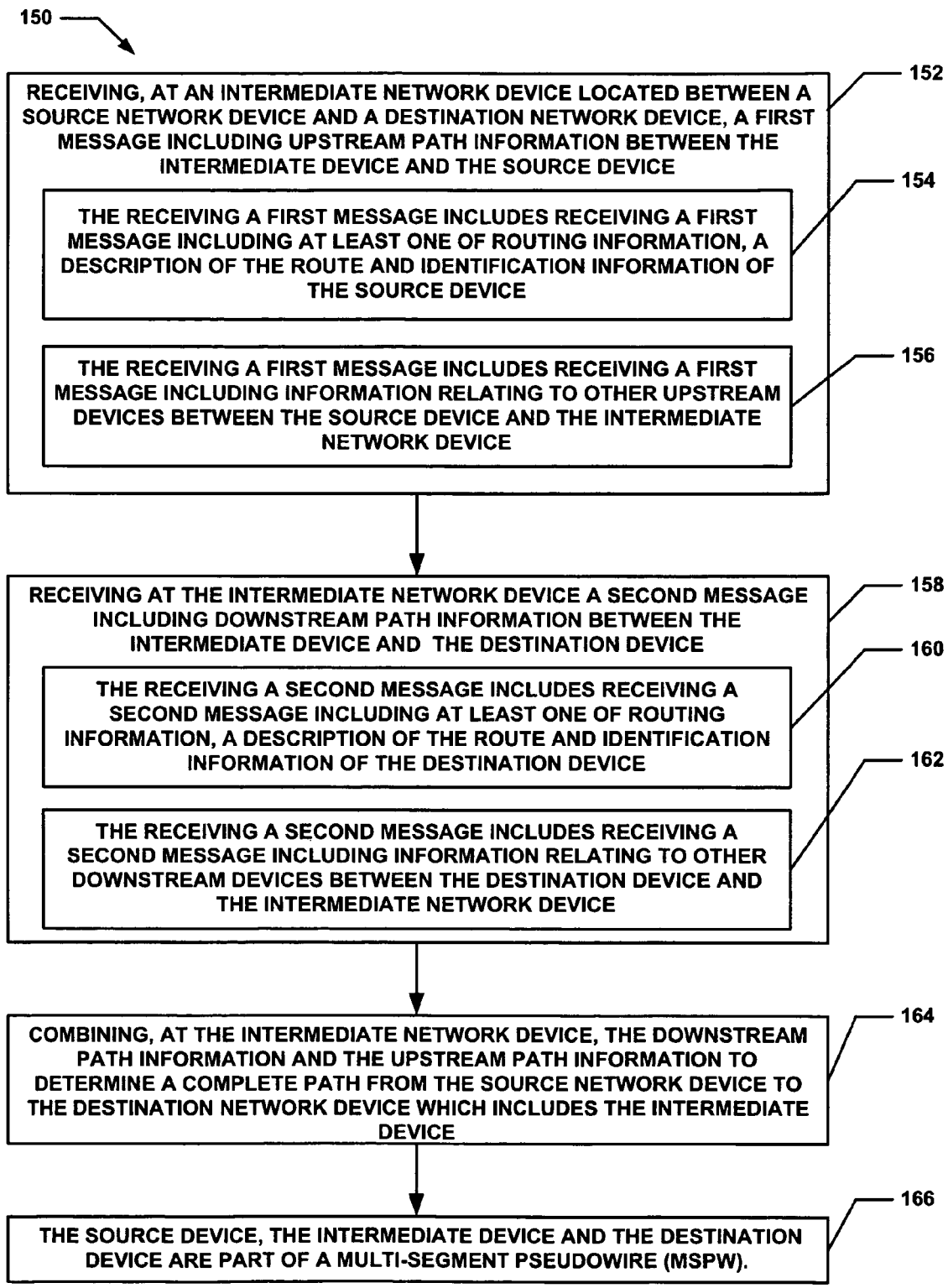
FIG. 3 illustrates a flowchart for a particular embodiment of a method of determining a path between network devices.

A flow chart of the presently disclosed methods is depicted in FIGS. 2 and 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a method 100 of providing information in a network is shown. The method 100 begins, as shown in processing block 102, with receiving, at a second device in the network, a first message having information relating to a first device in the network. The first device may be a U-PE and the second device may be a SP-PE.

As shown in processing block 104, receiving a first message comprises receiving a first message including at least one of routing information, a description of the route, and identification information of the first device. In processing block 106, the receiving a first message includes receiving a first message comprising one of a status message and a setup message. A setup message is used to establish the MS-PW, and a status message is sent by any node to peer nodes to indicate a link or next hop failure. As shown in processing block 108, the first message may include information relating to other devices upstream of the second device. For example, the message may include a TLV for the U-PE and TLVs for any upstream nodes in the path between the U-PE and the second device.

In processing block 110 the second device appends information relating to the second device to the first message, resulting in a second message. As recited in processing block 112, the appended information can be realized as a TLV which includes at least one of routing information, a description of the route and identification information of the second device.

In processing block 114 the second message is forwarded to a third device in the network. The second message comprises the first message and the TLV of the second device. The third device may be a U-PE or another SP-PE. In processing block 116, the first device, the second device and the third device are part of a Multi-Segment Pseudowire (MS-PW).

By way of the above method, the actual path that a PW setup message utilizes is documented and can be used for managing a complex network of PWs, particularly when spanning different providers. Further, by way of the above method, a PE can receive specific status messages from an intermediate S-PE or U-PE nodes, and take appropriate action. The PW switching TLV can be used in conjunction with PW status messages to indicate which specific node along the path has sent the PW status message.

Referring now to FIG. 3, a method 150 of determining a path between network devices is shown. The method begins with processing block 152 wherein a first message is received at an intermediate network device located between a source network device and a destination network device, the first message including upstream path information between the intermediate device and the source device. The source network device may be a U-PE and the intermediate network device may be a SP-PE.

As shown in processing block 154, the first message includes at least one of routing information, a description of the route and identification information of the source device. Further, as shown in processing block 156 the first message may include information relating to other upstream devices between the source device and the intermediate network device. This may include one or more TLVs.

In processing block 158 the intermediate network device receives a second message including downstream path information between the intermediate device and the destination device. As recited in processing block 160, the second message includes at least one of routing information, a description of the route and identification information of the destination device. In processing block 162, the second message may include information relating to other downstream devices between the destination device and the intermediate network device. This may include one or more TLVs.

In processing block 164, the downstream path information and the upstream path information are combined at the intermediate network device to determine a complete path from the source network device to the destination network device which includes the intermediate device. As shown in processing block 166 the source device, the intermediate device and the destination device are part of a Multi-Segment Pseudowire (MS-PW).

By way of the above-described method, every node in a path of nodes that make up a MS-PW can determine the entire path of nodes that make up the MS-PW.

Figure 4:
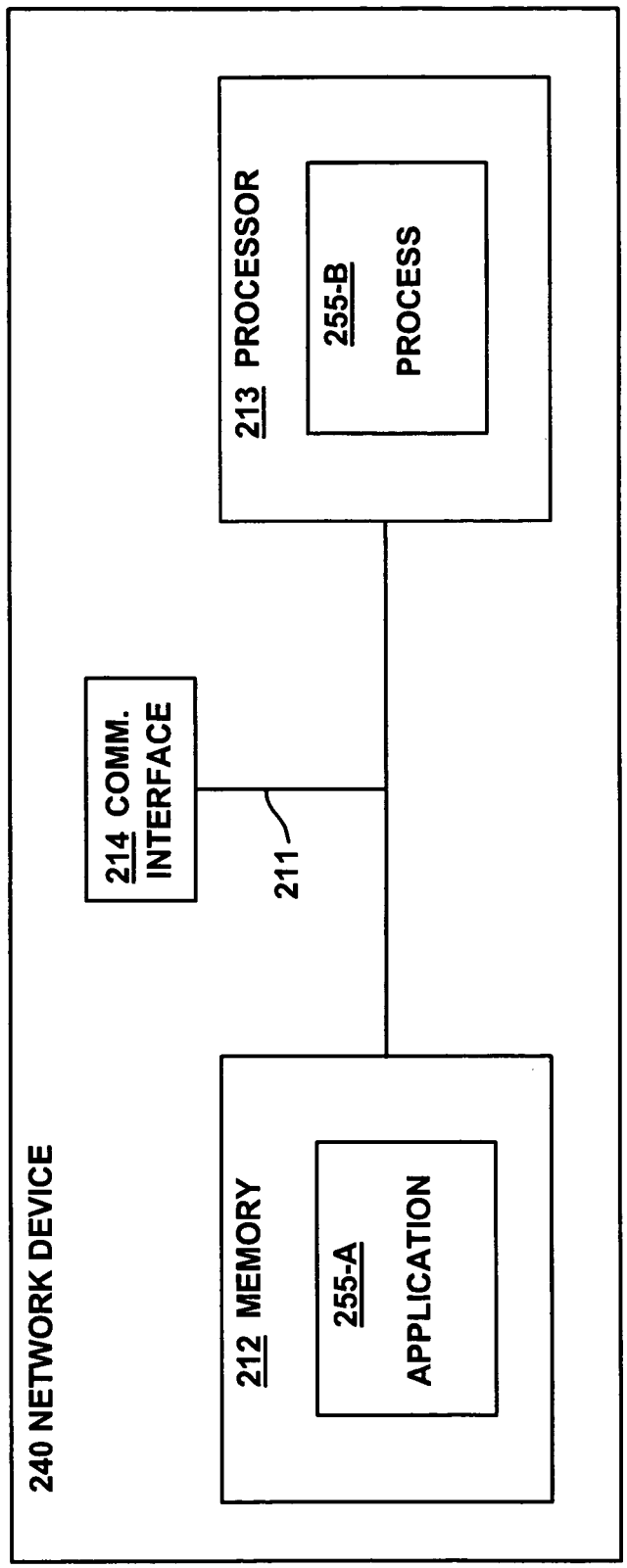
FIG. 4 illustrates an example network device architecture that provides and utilizes a Pseudowire switching TLV in accordance with embodiments of the invention.

FIG. 4 illustrates example architectures of a network device 240. In this example, the device 240 includes an interconnection mechanism 211 that couples a memory system 212, a processor 213, and a communications interface 214. The communications interface 214 allows the device 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the device 240.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
receiving, at a second device in a network, a message communicated to establish a Pseudowire that is configured to carry non-multiprotocol label switching (MPLS) packets between a plurality of devices in a path of the Pseudowire, the plurality of devices comprising a first device, the second device, and a third device, wherein the message includes first information relating to the first device, the first information including a first device identification that identifies the first device in the path of the Pseudowire;
appending, with the second device, second information relating to the second device to the message such that the message comprises both the first information related to the first device and the second information related to the second device, wherein the second information comprises a second device identification that identifies the second device in the path of the Pseudowire;
forwarding, with the second device, the message to the third device in the path of the Pseudowire after the second information is appended;
receiving, at the third device, the message from the second device, wherein the message includes a plurality of device identifications including the first device identification and the second device identification, and wherein the plurality of device identifications identifies the plurality of devices in the path of the Pseudowire that communicated the message prior to receipt by the third device; and
analyzing, with the third device, the plurality of device identifications to identify the plurality of devices in the path of the Pseudowire that communicated the message prior to receipt by the third device.

2. The method of claim 1 wherein the first information further comprises at least one of routing information or a description of a route of the Pseudowire.

3. The method of claim 2, wherein the routing information comprises first routing information and the description of the route comprises a first description of the route, and wherein the second information further comprises at least one of second routing information or a second description of the route of the Pseudowire.

4. The method of claim 1 wherein the Pseudowire comprises a Multi-Segment Pseudowire (MS-PW) that comprises a first portion that is configured to carry the non-multiprotocol label switching packets between the first device and the second device and a second portion that is configured to carry the non-MPLS packets between the second device and the third device.

5. The method of claim 1 further comprising:
receiving, at the second device in the path of the Pseudowire, a status message having third information relating to the third device in the path of the Pseudowire, wherein the third information comprises a third device identification that identifies the third device in the path of the Pseudowire; and
identifying, with the second device, that the third device is the device in the path of the Pseudowire that sent the status message.

6. A method of initially establishing a Pseudowire, the method comprising:
receiving, at a destination network device, an appended message to initially establish the Pseudowire from a source network device to the destination network device, wherein the Pseudowire is configured to carry non-multi-protocol label switching (MPLS) packets, wherein the appended message is communicated with a plurality of network devices in a path of the Pseudowire, including the source network device and at least one intermediate network device, before being received by the destination network device, and wherein the appended message, upon being received by the destination network device, comprises a plurality of device identifications that identifies the plurality of network devices in the path of the Pseudowire that communicated the message;
in response to receiving the appended message, recording, with the destination network device, the plurality of device identifications as a record of the plurality of network devices in the path of the Pseudowire that communicated the message before being received by the destination network device; and
analyzing, with the destination network device, the record to identify the plurality of network devices in the path of the Pseudowire that communicated the message before being received by the destination network device.

7. The method of claim 6 wherein the at least one intermediate network device comprises a first intermediate network device and a second intermediate network device, wherein the first intermediate device communicates with the source network device via a first service provider network, and wherein the second intermediate device communicates with the destination network device via a second service provider network.

8. The method of claim 6 wherein the appended message further includes at least one of intermediate network device routing information or a description of a route of the Pseudowire associated with the at least one intermediate network device.

9. A network comprising a first network device, in communication with a second network device, and in communication with a third network device, wherein
the second network device is configured to:
receive a message communicated to establish a Pseudowire, the Pseudowire configured to carry non-multiprotocol label switching (MPLS) packets between a plurality of network devices in a path of the Pseudowire, the plurality of network devices in the path comprising the first, second, and third network devices in the network, wherein the message includes first information relating to the first network device, the first information including a first device identification that identifies the first network device in the path of the Pseudowire;
append second information relating to the second network device to the message such that the message comprises both the first information related to the first network device and the second information related to the second network device, wherein the second information comprises a second device identification that identifies the second network device in the path of the Pseudowire;
forward the message to the third network device in the path of the Pseudowire after the second information is appended; and
wherein the third network device is configured to:
receive the message from the second network device, wherein the message includes a plurality of device identifications including the first device identification and the second device identification, and wherein the plurality of device identifications identifies the plurality of network devices in the path of the Pseudowire that communicated the message to receipt by the third network device; and analyze the plurality of device identifications to identify the plurality of network devices in the path of the Pseudowire that communicated the message prior to receipt by the third network device.

10. The network of claim 9 wherein the first information further includes at least one of routing information or a description of a route of the Pseudowire.

11. The network of claim 9 wherein the Pseudowire comprises a MultiSegment Pseudowire (MS-PW), wherein a first portion of the MS-PW is located between the first network device and the second network device, and wherein a second portion of the MS-PW is located between the second network device and the third network device.

12. The network of claim 9 wherein the second network device is further configured to:

receive a status message having third information relating to the third network device in the network path of the Pseudowire, the third information comprising a third device identification that identifies the third network device in the path of the Pseudowire; and identify that the third network device is the device in the path of the Pseudowire that send the status message.

13. A destination network device comprising:

a memory;

a processor;

a communications interface; and an interconnection mechanism coupling the memory, the processor and the communications interface, wherein the processor is configured to:

receive an appended message to establish a Pseudowire between a source network device and the destination network device, wherein the Pseudowire is configured to carry non-multi-protocol label switching (MPLS) packets, wherein the appended message is communicated with a plurality of network devices in a path of the Pseudowire, including the source network device and at least one intermediate network device, before receipt by the destination network device, and wherein the appended message, upon receipt by the destination network device, comprises a plurality of device identifications that identifies the plurality of network devices in the path of the Pseudowire that communicated the message before receipt by the destination network device;

in response to receipt of the appended message, record the plurality of device identifications as a record of the plurality of network devices in the path of the Pseudowire that communicated the message before receipt by the destination network device; and analyze the record to identify any of the plurality of network devices in the path of the Pseudowire that communicated the message before receipt by the destination network device.

14. The intermediate destination network device of claim 13 wherein the at least one intermediate network device comprises a first intermediate network device and a second intermediate network device, and wherein the first intermediate network device communicates with the source network device via a first service provider network, and wherein the second intermediate network device communicates with the destination network device via a second service provider network.

15. The intermediate network device of claim 13 wherein the appended message further includes at least one of intermediate network device routing information or a description of route of the Pseudowire associated with the at least one intermediate network device.

16. The destination network device of claim 13 wherein the Pseudowire comprises a Multi-Segment Pseudowire (MS-PW) that traverses the source network device, the at least one intermediate network device, and the destination network device, wherein a portion of the MS-PW is configured to carry the non-multiprotocol label switching packets between one of the at least one intermediate network device and the destination network device.

17. The method of claim 1, wherein the non-multiprotocol label switching packets comprise Asynchronous Transfer Mode (ATM) packets, Frame Relay (FR) packets, Point-to-Point Protocol (PPP) packets, High Level Data Link Control (HDLC) packets, Synchronous Optical Network (SONET) Frames packets, or Ethernet packets.

18. The method of claim 6, wherein the non-multiprotocol label switching packets comprise Asynchronous Transfer Mode (ATM) packets, Frame Relay (FR) packets, Point-to-Point Protocol (PPP) packets, High Level Data Link Control (HDLC) packets, Synchronous Optical Network (SONET) Frames packets, or Ethernet packets.

19. The network of claim 9, wherein the non-multiprotocol label switching packets comprise Asynchronous Transfer Mode (ATM) packets, Frame Relay (FR) packets, Point-to-Point Protocol (PPP) packets, High Level Data Link Control (HDLC) packets, Synchronous Optical Network (SONET) Frames packets, or Ethernet packets.

20. The destination network device of claim 13, wherein the non-multiprotocol label switching packets comprise Asynchronous Transfer Mode (ATM) packets, Frame Relay (FR) packets, Point-to-Point Protocol (PPP) packets, High Level Data Link Control (HDLC) packets, Synchronous Optical Network (SONET) Frames packets, or Ethernet packets.

21. The method of claim 6, further comprising:

transmitting, with the destination network device, a status message to one of the at least one intermediate network device, wherein the status message includes a destination network device identification that identifies that the destination network device sent the status message.

22. The destination network device of claim 13, wherein the processor is further configured to:

transmit a status message to one of the at least one intermediate network device, wherein the status message includes a destination network device identification that identifies that the destination network device sent the status message.

* * * * *